United States Patent [19]

Mori et al.

[11] 4,431,266

[45] Feb. 14, 1984

[54] OPTICAL REFRACTOR FOR DIFFUSING LIGHT

[75] Inventors: Leo Mori, Yokohama; Takashi Aoba, Ageo; Mamoru Tominaga, Yokohama; all of Japan

[73] Assignee: Tokyo Shibaura Denki Kabushiki Kaisha, Kawasaki, Japan

[21] Appl. No.: 318,367

[22] Filed: Nov. 5, 1981

[30] Foreign Application Priority Data

Nov. 10, 1980 [JP] Japan .................... 55-157892

[51] Int. Cl.$^3$ .................... G02B 27/00; G03B 21/60
[52] U.S. Cl. .................... 350/167; 350/128
[58] Field of Search .................... 350/127, 128, 167

[56] References Cited

U.S. PATENT DOCUMENTS

| | | | |
|---|---|---|---|
| 1,824,353 | 9/1931 | Jensen | 350/167 |
| 2,028,496 | 1/1936 | Chiti | 350/128 |
| 3,580,675 | 5/1971 | Heiber et al. | 350/167 |
| 3,672,894 | 6/1972 | Glenn | 350/167 |

Primary Examiner—Bruce Y. Arnold
Assistant Examiner—William Propp
Attorney, Agent, or Firm—Oblon, Fisher, Spivak, McClelland & Maier

[57] ABSTRACT

An optical refractor comprises a plate made of transparent material and having a first surface and a second surface. Segment lens elements of the same size are arranged on the first and second surface of the plate and formed integrally with the plate. The segment lens elements on the first surface are positioned in face-to-face relation with the segment lens elements arranged on the second surface, thus forming pairs of segment lens element. The segment lens elements have a common optical axis and convex surfaces, respectively. The focal lengths defined by these convex surfaces are equal. The focal point of one of the segment lens elements lies on the convex surface of the other segment lens element, and that of the other segment lens element lies on the convex surface of the first segment lens element.

12 Claims, 16 Drawing Figures

FIG. 1 PRIOR ART
FIG. 2 PRIOR ART
FIG. 3
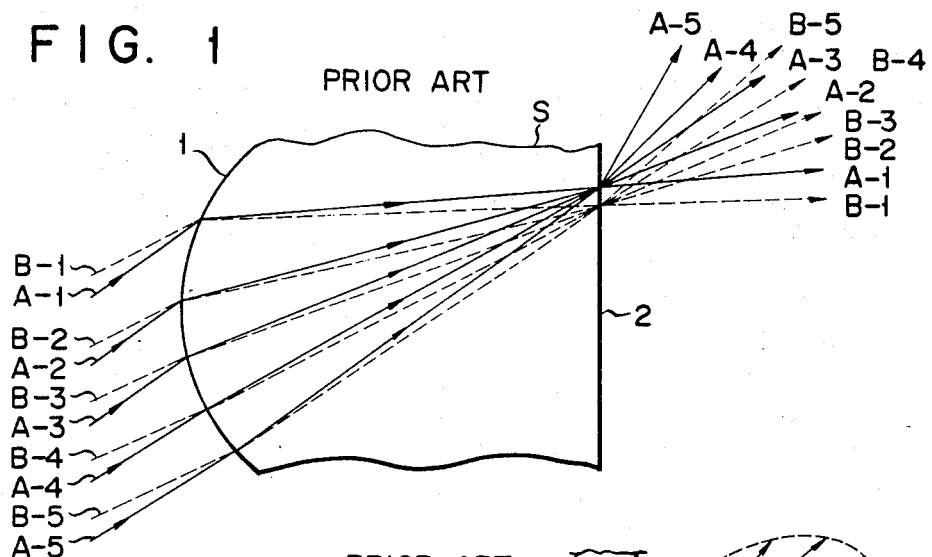
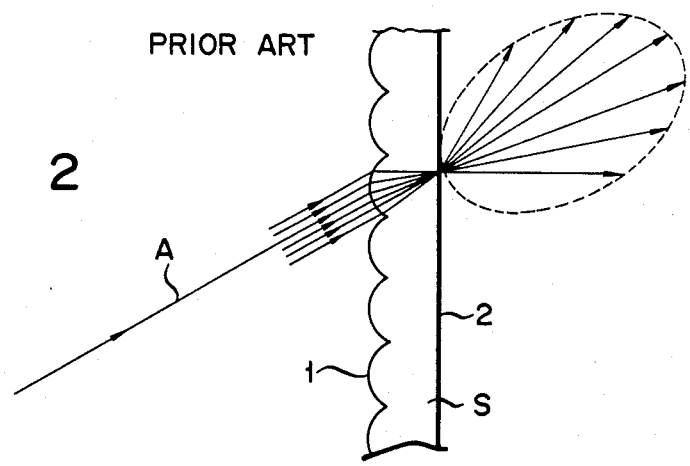
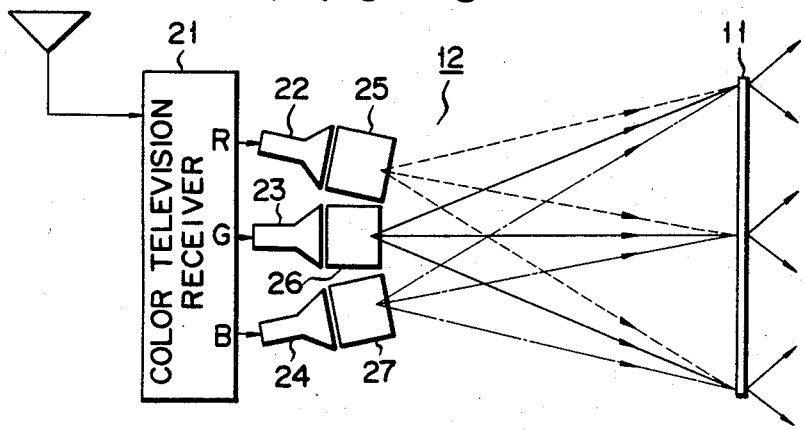

OPTICAL REFRACTOR FOR DIFFUSING LIGHT

BACKGROUND OF THE INVENTION

The present invention relates to an optical refractor for diffusing light, and more particularly an optical refractor which may be used as a transmissive screen of, for example, a color television system of transmissive type.

A transmissive type projection system such as a projective television system, a projective screen display system or an enlarging projection system is widely used today. Generally, it comprises a transmissive type projection screen and a projecting apparatus. The screen is made of transparent material. The projecting apparatus projects an enlarged picture onto one surface of the screen. The picture is then transmitted to the other surface of the screen and observed by viewers.

Various projecting apparatus are known. Among them are an apparatus of a monochromatic image type for projecting a monochromatic picture and an apparatus of a color image type for projecting different color pictures at the same time to form a composite color picture. The latter is used in combination with a color television receiver and simultaneously projects red, green and blue picture, thus forming a composite color picture on a transmissive type projection screen.

The quality of a picture formed on such transmissive projection screen depends largely on the optical characteristics of the screen. Screens of various structures have been invented. One of the well-known structures is a so-called "single surface lenticular lens structure." The screen of this type is made of transparent material. It has on one surface rows of segment lenses which are parallel and extending in vertical direction. Further, light diffusion treatment is applied on said surface of the screen.

The screen of single surface lenticular lens structure is disadvantageous in the following respect. A picture formed on it is less bright at the peripheral portions. Further, when three different color pictures are projected onto the screen in directions which are different a little, the color balance will differ according to the position where a viewer stands to watch the composite color picture. It will be described how this will happen, with reference to FIG. 1.

FIG. 1 is a sectional view of a known screen S of single surface lenticular lens structure. More precisely, FIG. 1 is a sectional view of one of segment lenses of the screen S. When a first light beam A consisting of rays A-1 to A-5 and containing picture information and a second light beam B consisting of rays B-1 to B-5 and containing picture information are projected onto the segment lens, they are refracted on a convex surface 1 of the segment lens, transmitted through the segment lens and emitted from the flat surface 2 of the segment lens.

As evident from FIG. 1, the axis (not shown) of the light beam A does not coincide with the axis (not shown) of the light beam B. Thus, if the screen S is used together with a projecting apparatus of color image type and three primary color light beams are projected onto the convex surface 1, the color balance perceived in a region between the rays A-1 and A-5 will inevitably differ from that perceived in a region between the rays B-1 and B-5.

Moreover, the screen S has another disadvantage. When parallel rays A-1 to A-5 are applied on the screen 2 as shown in FIG. 2, they propagate from the flat surface 2 in different directions in such way that the most intensive ray is emitted in a direction not perpendicular to the flat surface 2. This means that the picture formed on the flat surface 2 is not uniformly bright. Some portions of the picture are bright, and the others are dark.

Another type of transmissive screen is known, which comprises two projection screen members of single surface lenticular lens structure. The screen members are put together with their flat surfaces in mutual contact and with their rows of segment lenses arranged at right angles. The screen, however, has light transmission characteristics which are similar to those of the screen shown in FIGS. 1 and 2. It is not free of nonuniformity of brightness of a resultant picture and difference in color balance, either.

An improved transmissive projection screen is disclosed in Japanese Patent Disclosure (Kokai) No. 51-100723. This screen is of a double lenticular lens structure. That is, convex segment lenses are formed on both surfaces. The screen cannot regulate light distribution in both a horizontal plane and a vertical plane. It regulates light distribution only in one of these planes. To regulate light distribution in both planes, it must be assisted by a lenticular lens and a correction lens such as a Fresnel lens for projecting incident light substantially perpendicular to the screen. In effect, three optical elements, i.e. the screen, the lenticular lens and the correction lens, constitute a transmissive projection screen. The transmissive projection screen is not only complicated and expensive but also generates moire stripes due to interaction of the optical members. This is why the screen disclosed in the Japanese patent publication has not been put to practical use.

SUMMARY OF THE INVENTION

It is an object of the invention to provide an improved optical refractor which can diffuse light rays in such manner as to form a very, uniformly bright picture.

Another object of the invention is to provide an improved optical refractory which can diffuse light rays in such manner as to achieve good color balance and which may therefore be applied to a transmissive projection color television system.

According to the present invention an optical refractor is provided which comprises a plate of transparent material having a first and a second surface, a plurality of first segment lens elements for receiving light rays, and a plurality of second segment lens elements for diffusing the light rays. The first segment lens elements are integrally formed with the plate and arranged on the first surface of the plate. The second segment lens elements are integrally formed with the plate and arranged on the second surface, in face-to-face relation with the first segment lens element, respectively, thus forming a plurality of segment lenses. The first and second segment lens element have a common optical axis and a convex surface of revolution each. They have a substantially equal focal distance so that the focal point of the first segment lens element lies on the convex surface of the second segment lens element and that of the second segment lens element lies on the convex surface of the first segment lens element.

BRIEF DESCRIPTION OF THE DRAWINGS

FIG. 1 is a sectional view of one of the segment lenses of a known optical refractor;

FIG. 2 is a sectional view of the known optical refractor of FIG. 1, illustrating how the refractor diffuses rays;

FIG. 3 is a schematic diagram of a transmissive type color TV system in which an optical refractor of the present invention is used;

DETAILED DESCRIPTION OF THE PREFERRED EMBODIMENTS

Figure 4:
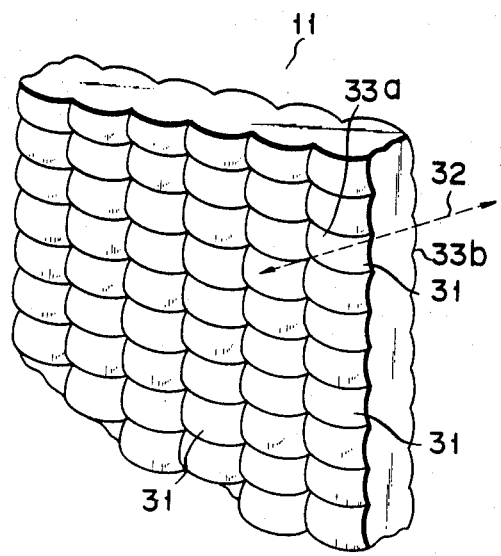
FIG. 4 is a perspective view of an optical refractor according to the present invention.

FIG. 3 schematically shows a transmissive type color TV system which is provided with an optical refractor according to the present invention. The system comprises a projecting apparatus 12 as well as an optical refractor (or a transmissive projection screen) 11. The refractor 11 is to diffuse light, and the apparatus 12 is to project a picture onto one surface or light-incidence surface of the refractor 11.

The projecting apparatus 12 is used in combination with a color TV receiver 21. The receiver 21 receives color TV video signals and separates them into red, green and blue signals. The red, green and blue signals are supplied respectively to cathode ray tubes 22, 23 and 24 which constitute the projecting apparatus 12. The cathode ray tubes 22, 23 and 24 are driven by the color TV receiver 21, and each forms a picture on its fluorescent screen. They are so positioned to have their fluorescent screens lie in face-to-face relation with the optical refractor 11. A red picture, a green picture and a blue picture are projected onto the light-incidence surface of the refractor 11 through projection lenses 25, 26 and 27. The lenses 25, 26 and 27 diverge light beams, whereby the red, green and blue pictures are enlarged on the light incidence surface of the refractor 11.

The optical refractor 11 is made of acryl, vinyl chloride, poly-carbonate or transparent polystyrene resin. Alternatively, it may be made of transparent material such as glass. As shown in FIG. 4, the refractor 11 consists of a number of segment lenses 31 whose optical axes are parallel to one another. The segment lenses 31 are arranged in a matrix form. For example, they are arranged in more than 500 rows and more than 500 columns. Each segment lens 31 is associated with one picture element.

Figure 5:
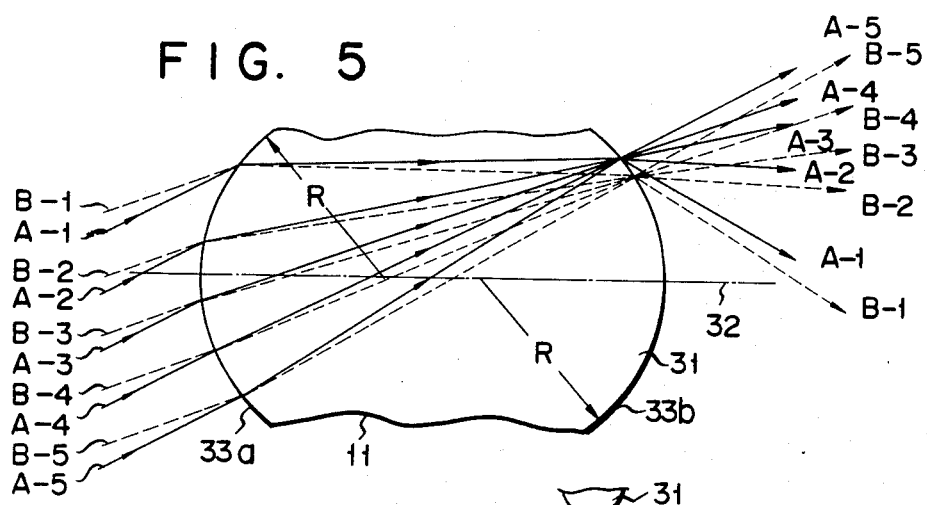
FIG. 5 is a sectional view of one of the segment lens pairs of the optical refractor shown in FIG. 4.

The segment lenses 31 have substantially the same size and the same shape. Both surfaces 33a and 33b of each segment lens 31 are convexes of revolution. Hence, the surfaces 33a and 33b have a common optical axis 23 as shown in FIG. 5. Further, the focal distances defined by the surfaces 33a and 33b are the same. The thickness of each segment lens 31, i.e. the distance between the both surfaces 33a and 33b along the optical axis 32, is nearly equal to the focal distance. For example, it is 2.5 to 3.5 times the radius of either convex surface 33a or 33b when the refractor 11 is made of acryl resin having a refractive index of about 1.49.

When the color television receiver 21 is turned on, it starts receiving color TV video signals. Each video signal is separated into red, green and blue signals. The red, green and blue signals are supplied respectively to the cathode ray tubes 22, 23 and 24, which form a red picture, a green picture and a blue picture on their fluorescent screens. The three pictures thus formed are projected to the optical refractor 11 through the projection lenses 25, 26 and 27, respectively. The light rays corresponding to these pictures propagate from the light-incidence surface of the refractor 11 to the light-diffusing surface thereof. Owing to the above-mentioned structure of the refractor 11, the light rays are effectively utilized. The light rays being effectively used, viewers can see a picture on the light-diffusing surface, which is uniformly bright over the enter light-diffusing surface and which has a constant color balance, no matter where they stand.

Suppose a first light beam A consisting of parallel rays A-1 to A-5 and a second light beam B consisting of parallel rays B-1 to B-5 are applied on the convex surface 33a of each segment lens 31 in different directions as illustrate in FIG. 5. Then, the rays A-1 to A-5 and the rays B-1 to B-5 are refracted, while propagating through the segment lens 31. More precisely, and are emitted in such directions as shown also in FIG. 5. More precisely, the beams A and B converge while travelling through the segment lens 31 and then diverge as they propagate from the convex surface 33b. And the axes of both diverging beam A and B are parallel to the optical axis of the segment lens 31, because the focal point of the convex surface 33a lies on the convex surface 33b and that of the convex surface 33b lies on the convex surface 33a. This holds true of every other segment lens 31.

Figure 7A:
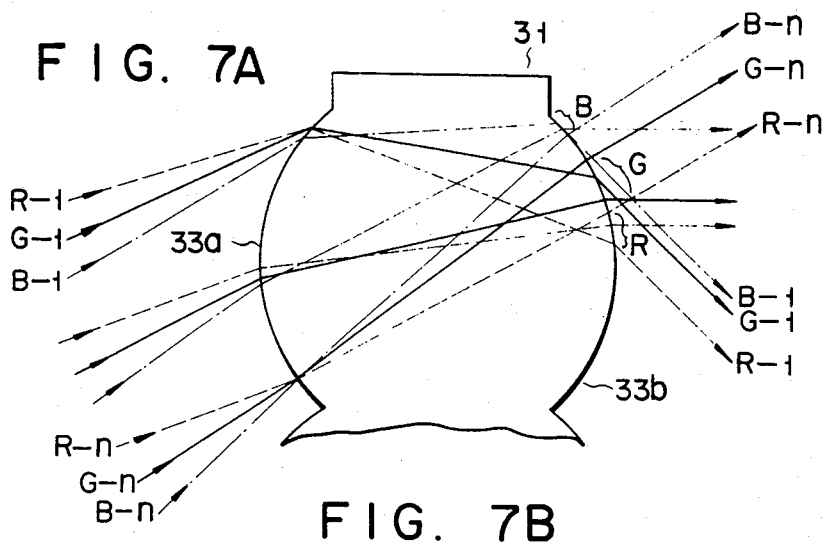
FIGS. 7A and 7B are sectional views of the segment lens of the refractor shown in FIG. 4, illustrating how the refractor transmits rays.
Figure 7B:
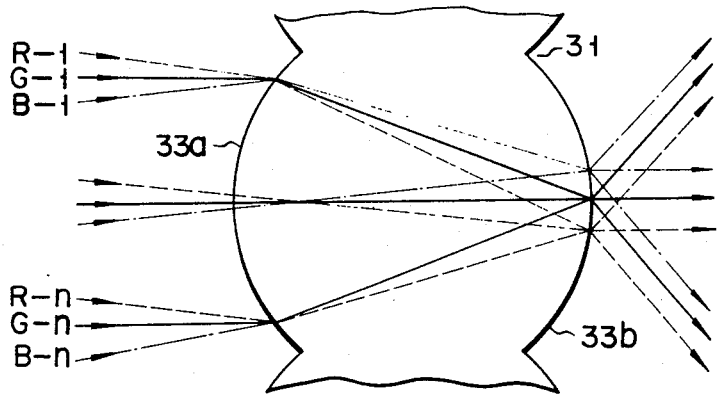

Hence, as shown in FIG. 7A and FIG. 7B, a red light beam consisting of parallel rays R-1 to R-n, a green light beam consisting of parallel rays G-1 to G-n and a blue light beam consisting of parallel rays B-1 to B-n are emitted from the convex surface 33b, each diverging at a specific angle and propagating in a direction substantially parallel to the optical axis 32 of the segment lens 31, no matter at what angles they are applied onto the convex surface 33a. The composite color picture which the red light beam, green light beam and blue light beam form has therefore a good color balance.

Figure 6:
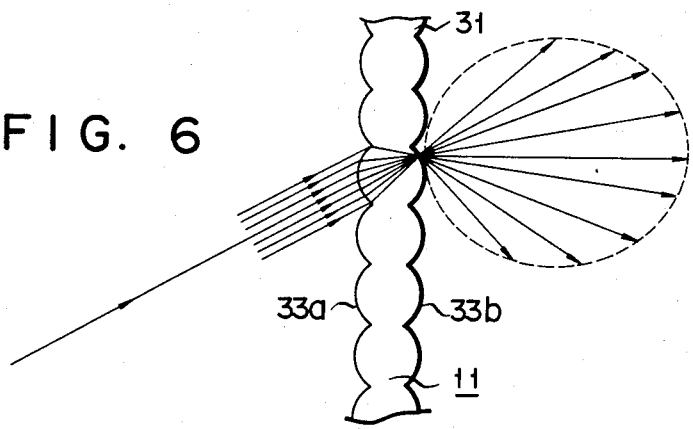
FIG. 6 is a sectional view of the optical refractor of FIG. 4, illustrating how the refractor distributes rays.

Further, as illustrated in FIG. 6, the rays of a light beam applied on the convex surface 33a of each segment lens 31 and converging at a point on the convex surface 33b are emitted from said point in various directions. Of these rays, the ray which is emitted from the convex surface 33b in a direction substantially parallel to the optical axis of the segment lens 31 is most intensive. In other words, the most intensive ray of all rays constituting a light beam is directed to viewers. That is, the rays emitted from the refractor 11 are effectively utilized, and the picture formed on the light-diffusing surface is uniformly bright. As far as the viewers have their eyes within a prescribed angle, they can see a picture which is uniformly bright.

With the above-described optical refractor 11 it is possible to control or regulate the distribution of rays from the light-diffusing surface of each segment lens 31 by using a proper material and by shaping the segment lenses appropriately. For example, the refractor 11 may be made of material having a refractive index of 1.49 and the segment lenses 31 may be arranged in horizontal direction at pitch of 1.6R and in vertical direction at pitch of 0.8R, where R is the radius of either convex surface 33a or 33b. In this case the rays are distributed in a pyramid-shaped space, diverging at 60° in horizontal plane and at 30° in vertical plane.

Figure 8:
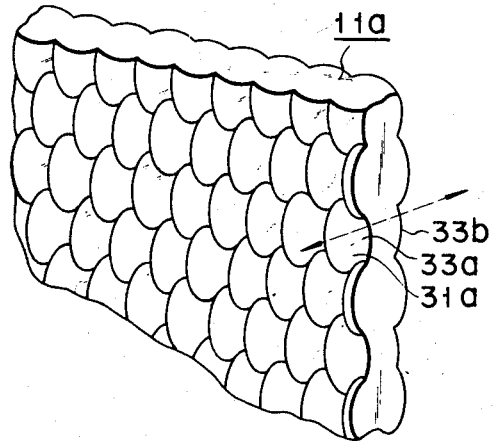
FIG. 8 is a perspective view of another optical refractor according to the present invention.

The present invention is not limited to the aforementioned embodiment. Other embodiments are possible. For instance, such an optical refractor 11a as shown in FIG. 8 is possible within the scope of the invention. As shown in FIG. 8, this refractor 11a consists of a number of segment lenses 31a which are hexagonal. Like the rectangular segment lenses 31 of the above-described embodiment, each segment lens 31a has to convex surfaces 33a and 33b which have a common optical axis 32a. The focal point of the convex surface 33a lies on the convex surface 33b, and that of the convex surface 33b lies on the convex surface 33a. The optical refractor 11a distributes rays in a substantially cone-shaped space. It achieves similar effects and does the above-described optical refractor 11.

Figure 9A:
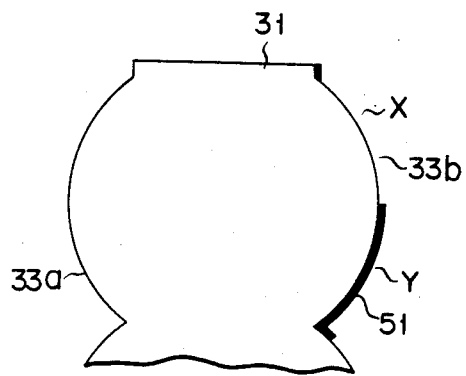
FIGS. 9A and 9B are each a sectional view of the segment lens of still another optical refractor according to this invention.
Figure 9B:
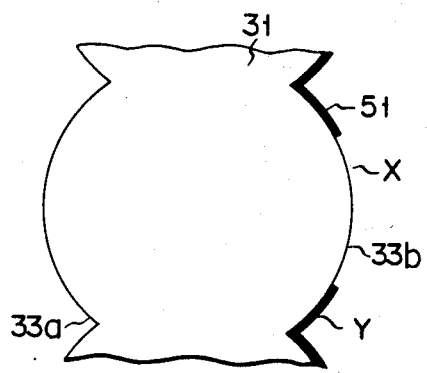

Moreover, as shown in FIGS. 9A and 9B, each segment lens 31 of, for example, the optical refractor 11 may have its convex surface 33b coated with black light-shielding material 51, except that portion X from which rays are emitted. FIG. 9A shows a segment lens 31 located at a peripheral portion of the refractor 11, and FIG. 9B a segment lens 31 positioned at the central portion of the refractor 11. The black material 51 shields stray rays from a light source other than the projection lenses 25, 26 and 27. It shields stray rays from the lenses 25, 26 and 27, too. This makes it possible that a composite color picture formed on the light-diffusion surface of the refractor 11 is well observed even in an excessively illuminated room.

Figure 10A:
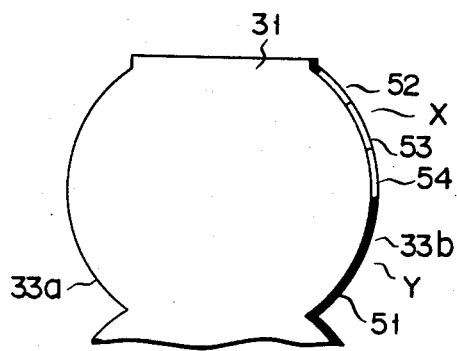
FIGS. 10A and 10B are each a sectional view of the segment lens of a further optical refractor according to the present invention.
Figure 10B:
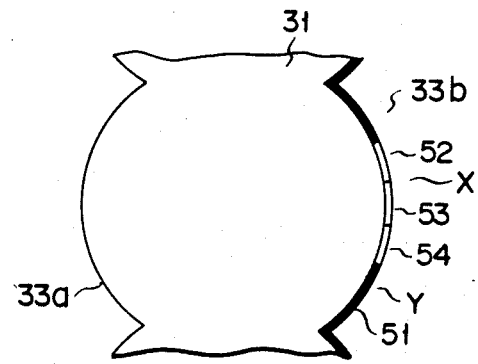

Still further, as shown in FIGS. 10A and 10B, each segment lens 31 of the optical refractor 11 whose convex surface 33b is partly coated with black light-shielding material 51 as shown in FIGS. 9A and 9B may have a red filter film 52, a gree filter film 53 and a blue filter film 54 on that portion X of the convex surface 33b which is not coated with the black material 51. FIG. 10A shows the segment lens 31 at a peripheral portion of the refractor 11, and FIG. 10B the segment lens 31 positioned at the central portion of the refractor 11. These filters 52, 53 and 54 reduce the influence of stray rays on the resultant color composite picture. Owing to the filters, the color picture can be well observed even in an excessively illuminated room.

Furthermore, a light diffusion treatment may be applied to some extent on the light transmitting portion X of either segment lens 31 shown in FIG. 9A or 9B. Then, the composite color picture can be seen even from a point which lies a little outside a regular region and can be more uniformly bright. To the same end, it is preferred that the optical referactors 11 and 11a shown respectively in FIGS. 4 and 8 should undergo light diffusion treatment.

Figure 11A:
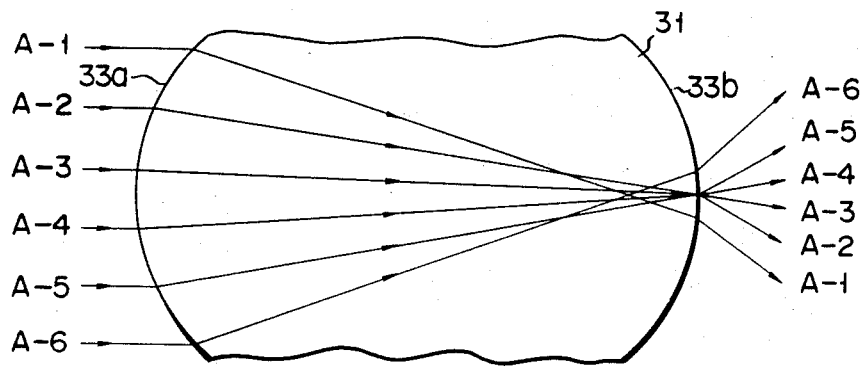
FIGS. 11A, 11B and 11C are each a sectional view of the segment lens of a further optical refractor according to this invention.

In the above-described embodiments each segment lens has two convex surfaces 33a and 33b which are symmetrical. For this reason, a light beam may diverge at an angle larger than a desired one, due to aberration. For instance, as illustrated in FIG. 11A, rays A-1 and A-6 of a light beam A may be deflected at too large an angle as they emerges from the convex surface 33b of a segment lens 31. As a result, the rays A-1 and A-6 cannot be effectively utilized. To utilize rays as effectively as possible, an optical refractor according to the present invention may be designed as follows:

(i) The refractor is made of material having a refractive index of 1.49. Each segment lens has two spherical surfaces. The radius R of the light-receiving surface is different from that r of the light-emitting surface as shown in FIG. 11A. Let d denote the thickness of the segment lens. Then, the refractor is designed to satisfy the following formulae:

$$2.0R < d < 4.0R, \ 0.8R < r < 1.2R.$$

Figure 11B:
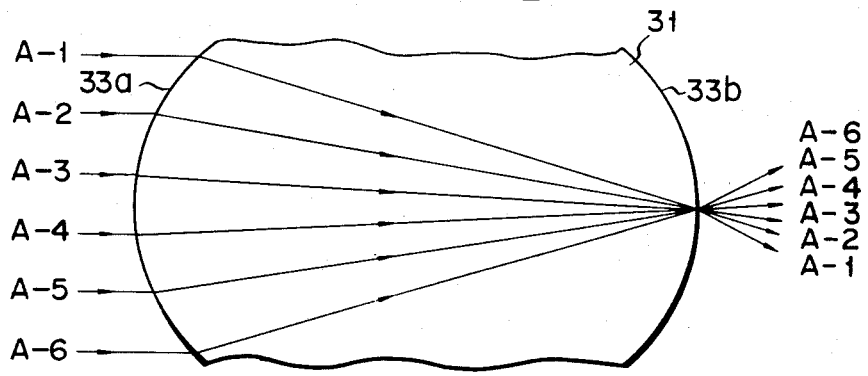

(ii) As shown in FIG. 11B, the refractor is made of material having a refractive index of 1.49. Each segment lens has two convex surfaces. The light-receiving surface is defined by an ellipse having a major axis R1 and a minor axis R2. The light-emitting surface is defined by an ellipse having a major axis r1 and a minor axis r2. Let d denote the thickness of the segment lens. Then, the refractor is so designed as to satisfy the following formulae:

$$1.0R1 < d < 3.0R1,$$

$$0.8R2/R1 < r2/r1 < 1.2R2/R1.$$

Figure 11C:
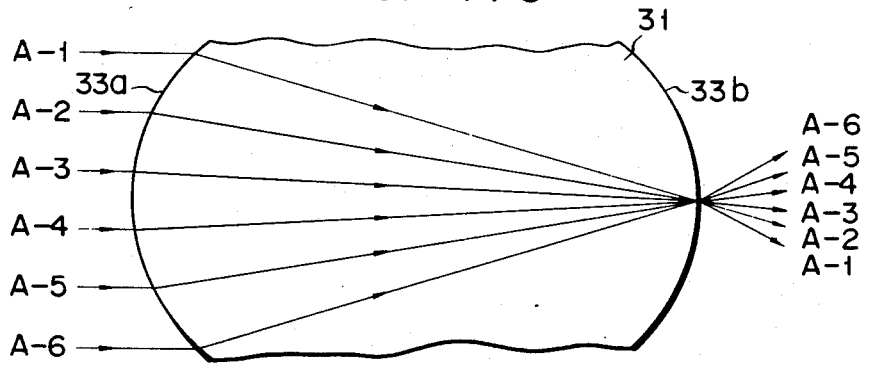

(iii) As shown in FIG. 11C, the refractor is made of material having a refractive index of 1.49. Each segment lens has two convex surfaces. The light-receiving surface is defined by an ellipse having a major axis R1 and a minor axis R2. The light-emitting surface is spherical and its radius is r. Let d denote the thickness of the segment lens. Then, the refractor is so designed as to satisfy the following formulae:

$$1.0R1 < d < 3.0R1, \ 0.25d < r < 0.5d.$$

As described above in detail, the present invention can provide an optical refractor which comprises only one transmissive projection screen, which can form on its light-diffusion surface a composite color picture of uniform brightness and good color balance, and which can easily control the distribution of light rays.

What we claim is:

1. An optical refractor comprising:
   a plate of transparent material hving a first and a second surface;
   a plurality of first segment lens elements of the same size and the same shape, integrally formed with the plate and arranged on the first surface of the plate; and
   a plurality of second segment lens elements of the same size and the same shape, integrally formed with the plate and arranged on the second surface of the plate in face-to-face relation with the first segment lens element, respectively, thereby forming a plurality of segment lenses, wherein the first and second segment lens elements of each pair have a common optical axis and a convex surface of revolution and have a substantially equal focal distance so that the focal point of the first segment lens element lies on the convex surface of the second segment lens element and that of the second segment lens element lies on the convex surface of the first segment lens element.

2. An optical refractor according to claim 1, wherein each of said first and second segment lens elements is formed with a rectangular shape.

3. An optical refractor according to claim 1, wherein each of said first and second segment lens elements is formed with a hexagonal shape.

4. An optical refractor according to any of claims 1 to 3, wherein one of the first and second segment lens elements has a spherical surface.

5. An optical refractor according to claim 4, wherein the other of the first and second segment lens elements has a convex surface defined by an ellipse.

6. An optical refractor according to any of claims 1 to 3, wherein one of the first and second segment lens elements has a convex surface defined by an ellipse.

7. An optical refractor according to any of claims 1 to 3, wherein both segment lens elements have a spherical surface.

8. An optical refractor according to claim 7, wherein both segment lens elements has convex surfaces of different curvature.

9. An optical refractor according to any of claims 1 to 3, wherein each of said second segment lens elements has a light-transmitting section and a light-blocking section covered with a light-shielding film.

10. An optical refractor according to claim 9, wherein said light-transmitting section of each second segment lens element is covered with a filter for transmitting light rays of a specific wavelength.

11. An optical refractor according to claim 9, wherein said light-transmitting section of each second segment lens element is covered with a plurality of filter layers for transmitting light rays of specific wavelengths.

12. An optical refractor according to claim 9, wherein said light-transmitting section of each second segment lens element diffuses light rays passing through it.

* * * * *